United States Patent
Fisher et al.

(10) Patent No.: US 11,669,451 B2
(45) Date of Patent: Jun. 6, 2023

(54) MULTI-PLANE SWITCHING OF NON-VOLATILE MEMORY

(71) Applicant: Micron Technology, Inc., Boise, ID (US)

(72) Inventors: Ryan G. Fisher, Boise, ID (US); Cory M. Steinmetz, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/464,427

(22) Filed: Sep. 1, 2021

(65) Prior Publication Data

US 2023/0063564 A1 Mar. 2, 2023

(51) Int. Cl.
*G06F 12/0806* (2016.01)
*G06F 12/02* (2006.01)

(52) U.S. Cl.
CPC ...... *G06F 12/0806* (2013.01); *G06F 12/0223* (2013.01); *G06F 2212/62* (2013.01)

(58) Field of Classification Search
None
See application file for complete search history.

(56) References Cited

U.S. PATENT DOCUMENTS

| 9,257,203 | B2 | 2/2016 | Ratnam et al. | |
| 2016/0005469 | A1* | 1/2016 | Kim | G11C 16/10 365/185.11 |
| 2020/0151106 | A1* | 5/2020 | Ahn | G06F 12/0882 |
| 2021/0294503 | A1* | 9/2021 | Lee | G06F 1/28 |

OTHER PUBLICATIONS

RealSSD 2.5-Inch SATA NAND Flash Solid State Drive (SSD), http://static6.arrow.com/aropdfconversion/ce9d7c5271f2e6239dacf1abf10a200b10ebc2c2/realssd_flash_drive_2.5.pdf, Micron Technology, Inc, Dec. 2007, 22 pages.

\* cited by examiner

*Primary Examiner* — Charles J Choi
(74) *Attorney, Agent, or Firm* — Brooks, Cameron & Huebsch, PLLC

(57) ABSTRACT

A method includes transferring data out of a first buffer coupled to a first plane of a plurality of planes of a memory component, where the data was previously transferred from the first plane to the first buffer responsive to an access request to sense data stored in the plurality of planes of the memory component. The method further includes transferring, subsequent to transferring the data out of the first buffer and independently of a command from a processing device, data out of a second buffer coupled to a second plane of the plurality of planes of the memory component, where the data transferred out of the second buffer was previously transferred from the second plane to the second buffer responsive to the access request.

17 Claims, 5 Drawing Sheets

MULTI-PLANE SWITCHING OF NON-VOLATILE MEMORY

TECHNICAL FIELD

Embodiments of the disclosure relate generally to memory sub-systems, and more specifically, relate to multi-plane switching of non-volatile memory.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
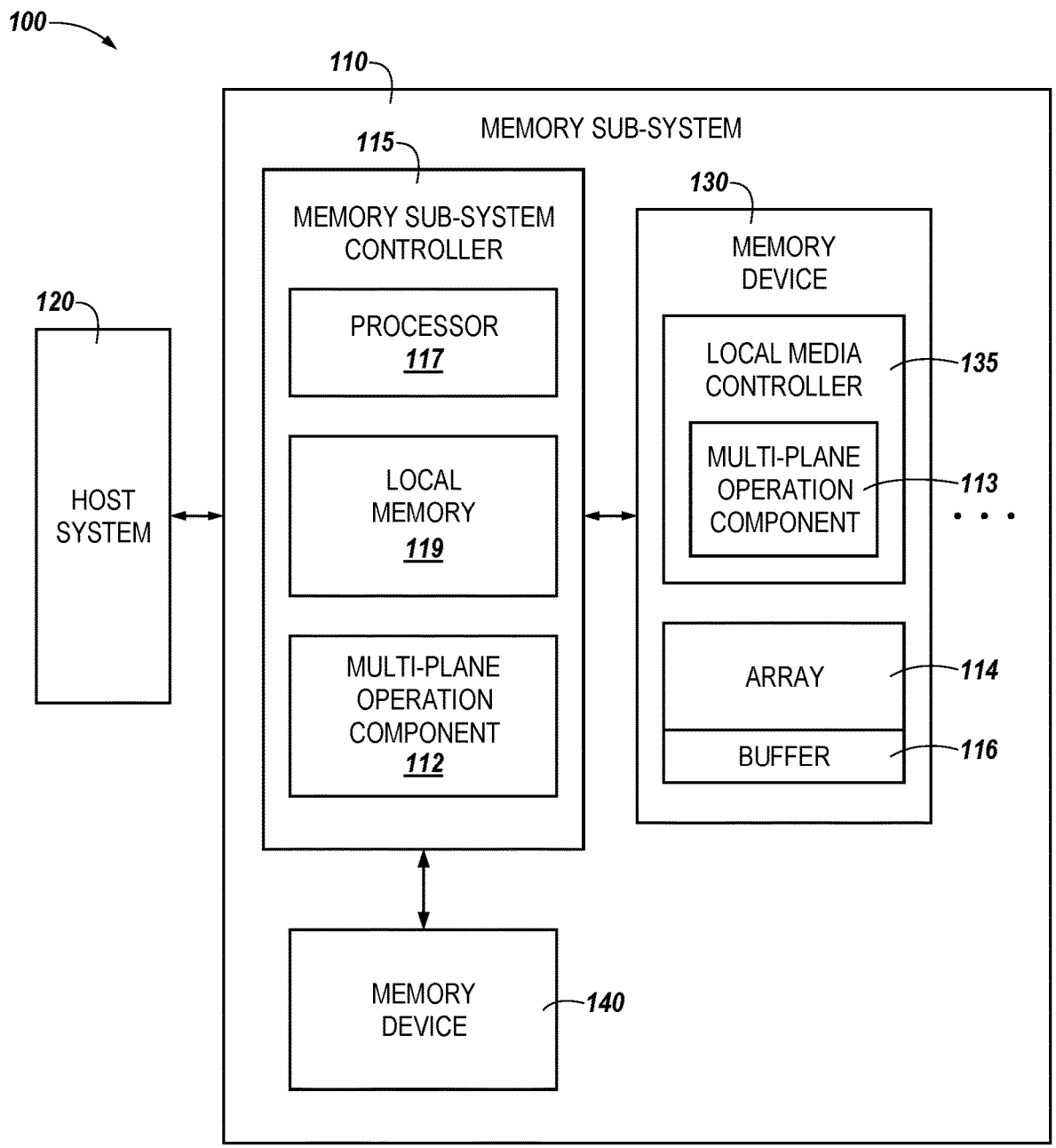
FIG. 1 illustrates an example computing system that includes a memory sub-system in accordance with some embodiments of the present disclosure.

Aspects of the present disclosure are directed to multi-plane switching of non-volatile memory, in particular to memory sub-systems that include a multi-plane operation component to cause a memory component to transfer data out of cache registers coupled to respective planes as part of the performance of a multi-plane sense (e.g., read) operation. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. A memory die can be referred to herein as a "logical unit" or a "LUN." A memory die can further include one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each plane of a non-volatile memory device can be coupled to a respective buffer (e.g., page buffer), which can further include a set of a data register and a cache register. The buffer can be used to temporarily store data transferred from the non-volatile memory device. Some types of read operations (e.g., a multi-plane read operation) that can be performed on a non-volatile memory device involves sensing data stored in (e.g., pages of) multiple planes. During the read operations, data transferred to the buffers (e.g., cache registers) can be sequentially transferred out of the cache registers (e.g., to an external memory sub-system controller). In previous approaches, this data transfer from the cache registers has been controlled by the memory sub-system controller. For example, in such approaches, the memory sub-system controller has to issue a dedicated command (e.g., a change read column command and/or a change read column enhanced command) each time a respective portion of the data was transferred out of the respective cache register so as to initiate transfer of another portion of the data out of the subsequent cache register. This operation by the memory sub-system controller inevitably consumes resources of the memory sub-system controller and incurs latencies associated with issuing and/or executing the dedicated command, which can be worsened as a quantity of planes associated with the multi-plane read operation increases.

Aspects of the present disclosure address the above and other deficiencies by providing a multi-plane sense (e.g., read) operation scheme for NAND memory devices that can cause the NAND memory devices to perform the multi-plane read operation without receiving such dedicated commands from the memory sub-system controller. For example, embodiments of the present disclosure allow NAND memory devices to automatically initiate transfer of data out of the subsequent cache register without being directed by a dedicated command, which can eliminate the latencies associated with the controller issuing and/or executing the dedicated commands in performing the multi-plane read operation.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

An example of non-volatile memory devices (e.g., memory device 130) includes a negative-and (NAND) type flash memory. Each of the memory devices 130 can include one or more arrays of memory cells. The memory cells can include single level cells (SLCs) that can store one bit per cell, multi-level cells (MLCs) that can store two bits per cell, triple level cells (TLCs) that can store three bits per cell, quad-level cells (QLCs) that can store four bits per cell, and/or penta-level cells (PLCs) that can store five bits per cell, among others. As used herein, the term multiple level cells is used to refer to cells configured to store more than one bit per cell (e.g., MLC, TLC, QLC, PLC, etc.). In some embodiments, a particular memory component can include an SLC portion, and an MLC portion, a TLC portion, a QLC portion, and/or a PLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as and NAND type memory are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RANI (CBRAM), resistive random access memory (RRAM), oxide based RRAM (OxRAM), negative-or (NOR) flash memory, and electrically erasable programmable read-only memory (EEPROM).

Although not illustrated herein, the array 114 can be further coupled to sensing circuitry (e.g., one or more sense amplifiers and/or compute components) that can read and latch a page (e.g., row) of data from the array 114. The memory device 130 further includes a buffer 116 coupled to the sensing circuitry and/or the array 114. The buffer 116 can include registers (e.g., data registers 336 and/or cache registers 338 as further illustrated in FIG. 3) that can temporarily store data to be written to and/or sensed from the array 114.

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the array 114 of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can further include multi-plane operation components 112 and 113 in the memory sub-system controller 115 and the local media controller 135, respectively, that can cause a memory device 130 to transfer data out of buffer 116 (e.g., the cache registers of buffer 116) coupled to respective planes of array 114 as part of the performance of a multi-plane sense (e.g., read) operation. In some embodiments, the memory sub-system controller 115 includes at least a portion of the multi-plane operation component 112. For example, the memory sub-system controller 115 can include a processor 117 (processing device) configured to execute instructions stored in local memory 119 for performing the operations described herein. In some embodiments, the multi-plane operation component 112 is part of the host system 110, an application, or an operating system.

The multi-plane operation component 112 can specify a manner in which a multi-plane read operation is performed on the memory device 130. For example, the multi-plane operation component 112 of the memory sub-system controller 115 can enable a configuration so as to cause (e.g., the multi-plane operation component 113 of local media controller 135 of) the memory device 130 to perform an operation (e.g., a multi-plane read operation) according to a manner specified by the enabled configuration. As described herein, a multi-plane read operation, when performed on the memory device 130, causes data stored in a page of planes of the array 114 to be read from (e.g., transferred out of) the memory device 130 to the memory sub-system controller 115. In some embodiments, the multi-plane operation component 112 can issue a set feature command to the memory device 130 to cause the memory device 130 to perform a configuration operation (e.g., alternatively referred to as a feature address operation) that causes memory device 130 to perform the multi-plane read operation according to the configuration. Although embodiments are not so limited, the multi-plane operation component 112 can provide a configuration and/or issue a set feature command to each respective memory die of the memory device 130.

Figure 3:
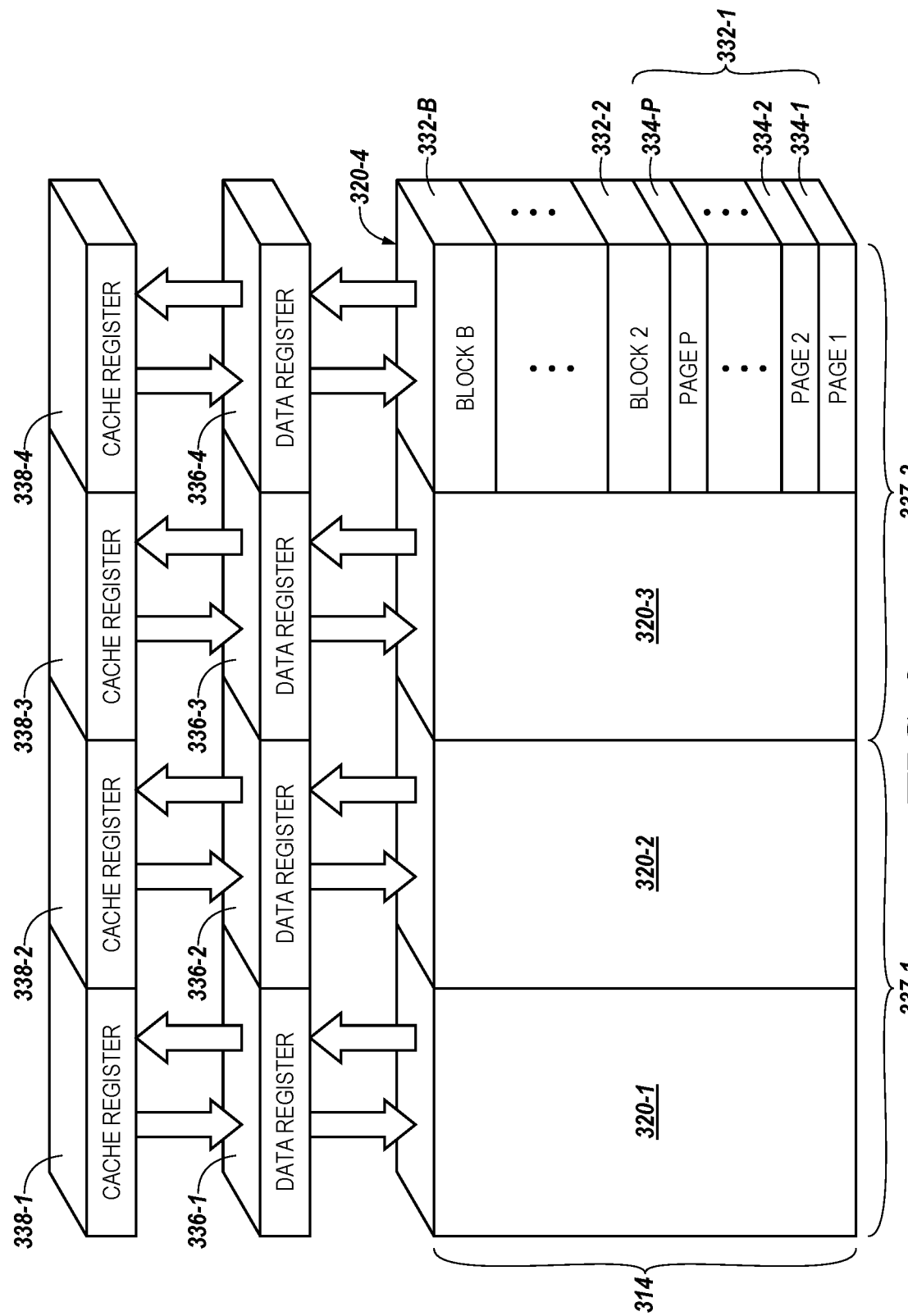
FIG. 3 illustrates a block diagram of a memory array and registers coupled to the memory array in accordance with some embodiments of the present disclosure.

The configuration can define (e.g., specify) a range of column addresses that corresponds to a size of data (e.g., a page size of the planes) to be transferred out of a respective cache register (e.g., the respective cache register 338 illustrated in FIG. 3). For example, the range of column addresses specified by the configuration can further specify marginal values (e.g., a first marginal value and a second marginal value that is greater than the first marginal value), such as, for instance, column addresses (e.g., a first and a last column addresses) such that when the multi-plane operation component 113 determines that data corresponding to the second marginal value (e.g., the last column address) is transferred out of the respective cache register, the multi-plane operation component 113 can switch to a subsequent cache register (e.g., the subsequent cache register 338) to initiate transferring data out of the subsequent cache register.

Once the configuration is enabled and provided to (e.g., the multi-plane operation component 113 of) the local media controller 135, the multi-plane operation component 113 can cause the local media controller 135 to perform a multi-plane read operation according to the received configuration independently of a command from controller 115, such as without receiving one or more change read column commands and/or change read column enhanced commands. As described herein, for example, the multi-plane operation component 113 can transfer data sequentially from a location (e.g., data portion) corresponding to a first column address of (e.g., a page of) a plane to a location (e.g., data portion) corresponding to a last column address of (e.g., a page of) the plane as specified by the enabled configuration. When the multi-plane operation component 113 determines that data corresponding to the last column address specified by the configuration has been transferred out of the cache register (e.g., the cache register 338 illustrated in FIG. 3) of the buffer 116, the multi-plane operation component 113 can automatically initiate transferring data out of a subsequent cache register (e.g., the cache register 338 illustrated in FIG. 3) of the buffer 116 without being directed by a change read column and/or change read column enhanced command. Once the multi-plane operation component 113 determines that data was transferred out of the last cache register (e.g., the cache register 338 illustrated in FIG. 3) of the buffer 116, the multi-plane operation component 113 can stop transferring data out of the buffer 116 and the performance of the multi-plane read operation is completed.

Although not illustrated in FIG. 1, the multi-plane operation component 113 can further include a counter (e.g., column address counter), which can be used to determine whether data corresponding to the marginal (e.g., last)

column address specified by the configuration has been transferred out of. For example, the multi-plane operation component 113 can sequentially update (e.g., increment and/or decrement) the counter from an initial value (e.g., corresponding to a first column address specified by the configuration) each time data corresponding to a respective column address has been transferred out of the respective cache register of the buffer 116 and when the updated value of the counter corresponds to the last column address specified by the configuration, the multi-plane operation component 113 can switch to the subsequent cache register to initiate transferring data out of the subsequent cache register. Therefore, embodiments of the present disclosure eliminate the latencies associated with executing change read column commands and/or change read column enhanced commands in performing multi-plane read operations.

Figure 2:
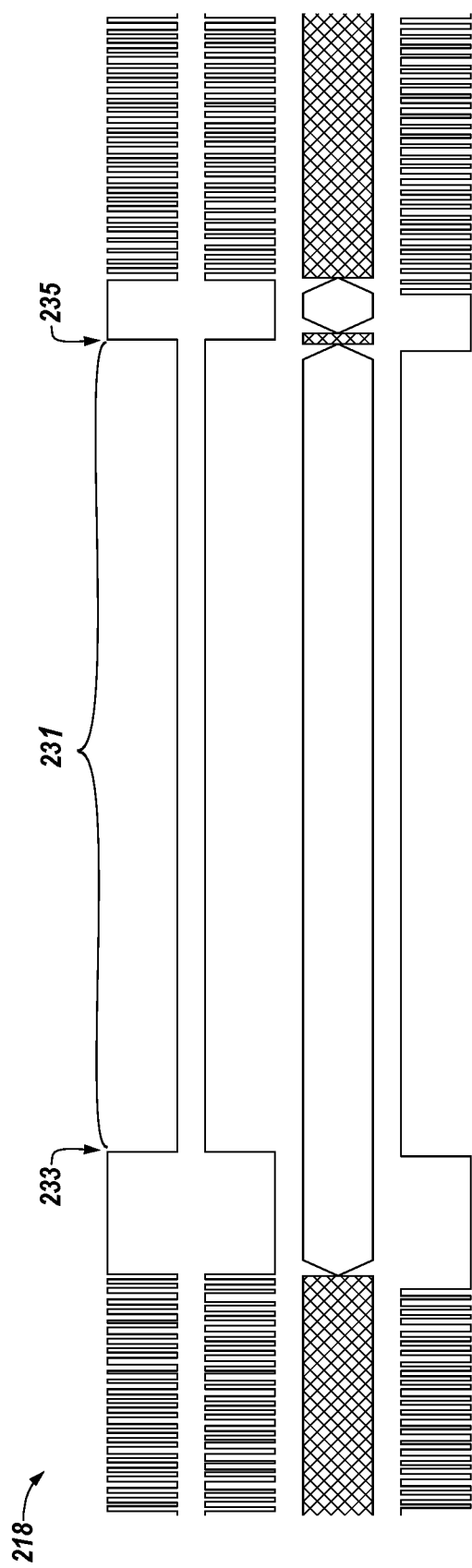
FIG. 2 illustrates an example timing diagram associated with performing a multi-plane read operation in accordance with some embodiments of the present disclosure.

FIG. 2 illustrates an example timing diagram 218 associated with performing a multi-plane read operation in accordance with some embodiments of the present disclosure. For example, FIG. 2 illustrates a timing diagram associated with performing a multi-plane read operation without receiving a change read column command and/or a change read column enhanced command, which would have been issued externally from an external controller (e.g., the memory sub-system controller 115 illustrated in FIG. 1) as part of the performance of the multi-plane read operation in previous approaches.

For example, in such a previous approach, a page read command may be issued to transfer data from one plane of a memory array, and to further transfer the data out of a cache register coupled to the plane. Once the data is transferred out of the cache register, a number of additional commands can be issued to switch to a subsequent cache register and initiate a transfer of data out of that cache register. These commands can be executed in a sequence, and can be collectively referred to as a change read column enhanced command. Subsequent to the execution of the change read column enhanced command, data can be transferred out of the subsequent cache register. The period of time between executing the change read column enhanced command and transferring the data out of the subsequent cache register can correspond to a latency associated with switching between cache registers during the performance of the multi-plane read operation.

In contrast, as illustrated in FIG. 2, the only latency the memory sub-system (e.g., the memory sub-system 110 illustrated in FIG. 1) experiences in switching between planes as part of performing a multi-plane read operation in accordance with the present disclosure is a period of time 231 that corresponds to a change column setup time. For example, once data is transferred out of one cache register at a time 233 of FIG. 2, a data transfer out of a subsequent cache register can be initiated upon expiration of the period of time 231 (e.g., at a time 235 of FIG. 2) and without executing the commands of the change read column enhanced command sequence.

FIG. 3 illustrates a block diagram of a memory array 314 and registers coupled to the memory array 314 in accordance with some embodiments of the present disclosure. The memory array 314 can be analogous to the memory array 114 illustrated in FIG. 1.

A memory die can include a number of planes. For example, a memory die 337-1 includes planes 320-1 and 320-2 and a memory die 337-2 includes planes 320-3 and 320-4 as illustrated in FIG. 3. A plane can include a number of blocks. For example, the plane 320-4 includes a number of blocks 332-1, 332-2, . . . , 332-B as illustrated in FIG. 3. As described herein, a block of memory cells can be erased together in one erase operation.

A block can further include a number of pages. For example, the block 332-1 can include pages 334-1, 334-2, . . . , 334-P, as illustrated in FIG. 3. As described herein, a page of memory cells can be written or read together in one write or read operation. Embodiments are not limited to a particular number of dice, planes, blocks, and/or pages that are respectively included in a memory device (e.g., the memory device 130 illustrated in FIG. 1), a die, a plane, and/or a block.

Each plane can be coupled to a respective set of a cache register and a data register. As illustrated in FIG. 3, for example, the plane 320-1 is coupled to a data register 336-1 and a cache register 338-1; the plane 320-2 is coupled to a data register 336-2 and a cache register 338-2; the plane 320-3 is coupled to a data register 336-3 and a cache register 338-3; and the plane 320-4 is coupled to a data register 336-4 and a cache register 338-4. As used herein, a set of cache register and a data register can be collectively referred to as a buffer (e.g., the buffer 116 illustrated in FIG. 1). Although not illustrated in FIG. 3, the cache registers 338 can be coupled to a number of data buses (e.g., DQ buses) via which data can be received at and/or transferred out of the cache registers 338.

Each plane 320-1 to 320-4 can be in bidirectional communication with a data register 336-1 to 336-4, respectively and each data register 336-1 to 336-4 can be in bidirectional communication with a cache register 338-1 to 338-4, respectively. For example, during write operations, data received at a respective cache register 338 can be transferred to a respective data register 336 and subsequently to a respective memory plane 320. For example, during read operations (e.g., multi-plane read operation), data can be transferred from a memory plane 320 firstly to a respective data register 336 and subsequently to a respective cache register 338.

When a multi-plane read operation is performed on the memory array 314, a page of data in each plane 320 can be transferred to the respective data register 336 and further to the respective cache register 338. As part of the performance of the multi-plane operation, data transferred to and stored in the cache registers 338 can be sequentially transferred out of the cache registers 338. For example, the data can be transferred out of the cache register 338-2 once the data is transferred out of the cache register 338-1; the data can be transferred out of the cache register 338-3 once the data is transferred out of the cache register 338-2; and the data can be transferred out of the cache register 338-4 once the data is transferred out of the cache register 338-3.

As described herein, the switching to transfer data sequentially out of the cache registers 338 can be controlled independently of a command from the memory sub-system controller (e.g., the memory sub-system controller 115 illustrated in FIG. 1) when a configuration is enabled by and provided externally from the memory sub-system controller. For example, once the data is transferred out of the cache register 338-1, the multi-plane operation component 113 can automatically switch to transferring the data out of the cache register 338-2 without being directed by a command (e.g., a change read column command and/or a change read column enhanced command) that would have been issued from the memory sub-system controller (e.g., the memory sub-system controller 115 illustrated in FIG. 1) in previous approaches. Therefore, in contrast to the previous approaches where three dedicated commands (e.g., a change read column command or a change read column enhanced command)

were used to issue to transfer data out of each of the four cache registers 338-1 to 338-4, the embodiments of the present disclosure can perform a multi-plane read operation without experiencing latencies associated with issuing and/or executing the dedicated commands.

Figure 4:
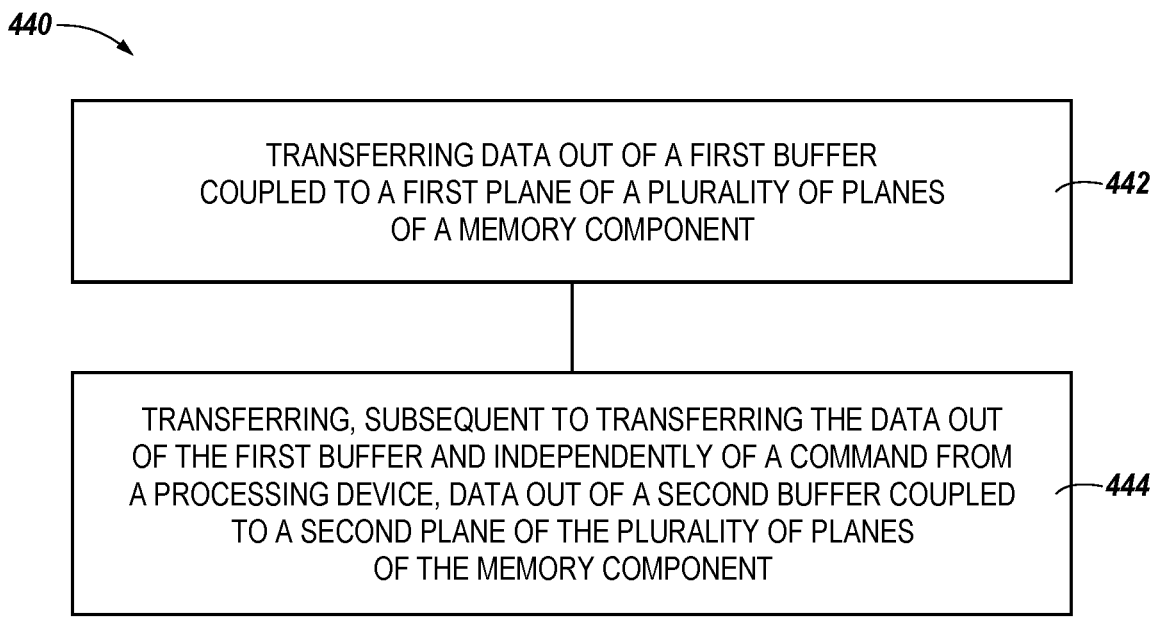
FIG. 4 is a flow diagram corresponding to a method for multi-plane sensing of non-volatile memory in accordance with some embodiments of the present disclosure.

FIG. 4 is a flow diagram corresponding to a method 440 for multi-plane switching of non-volatile memory in accordance with some embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the multi-plane operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 442, data can be transferred out of a first buffer (e.g., the cache register 338-1 illustrated in FIG. 3 of buffer 116 illustrated in FIG. 1) coupled to a first plane of a plurality of planes (e.g., the planes 320-1 to 320-4 illustrated in FIG. 3) of a memory component (e.g., plane 320-1 illustrated in FIG. 1). Prior to being transferred out of the first buffer, the data was previously transferred from the first plane to the first buffer responsive to an access request (e.g., access request to perform a multi-plane read operation) to sense data stored in the plurality of planes of the memory component.

At operation 444, data can be transferred out of a second buffer (e.g., the cache register 338-2 illustrated in FIG. 3 of buffer 116 illustrated in FIG. 1) coupled to a second plane (e.g., plane 320-1 illustrated in FIG. 3) of the plurality of planes of the memory component subsequent to transferring the data out of the first buffer and independently of a command (e.g., a change read column command and/or a change read column enhanced command) from a processing device (e.g., the memory sub-system controller 115 illustrated in FIG. 1). For example, the data can be transferred out of the second buffer without receiving a command from the processing device. As an example, the data can be transferred out of the second buffer without a column address cycle or a row address cycle associated with executing a command from the processing device.

In some embodiments, when it is determined that a portion of the data transferred out of the first buffer corresponds to a last column address of the first plane, data can be transferred out of the second buffer corresponding to a first column address of the second plane responsive to the determination. In some embodiments, the data can be transferred out of the second buffer upon expiration of a change column setup time (e.g., the period of time 231 illustrated in FIG. 2) subsequent to transferring the data out of the first buffer.

Figure 5:
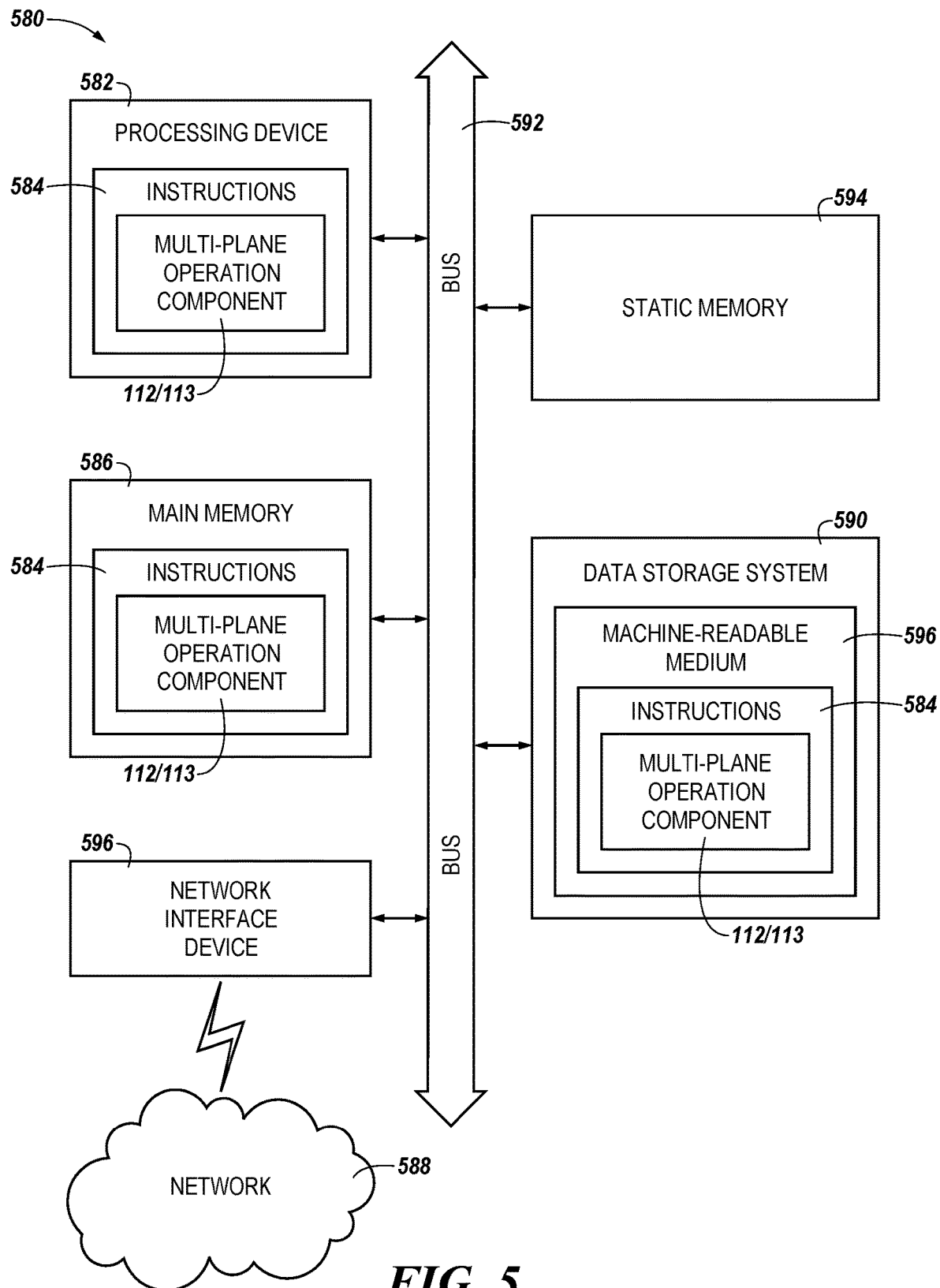
FIG. 5 is a block diagram of an example computer system in which embodiments of the present disclosure can operate.

FIG. 5 is a block diagram of an example computer system 580 in which embodiments of the present disclosure can operate. For example, FIG. 5 illustrates an example machine of a computer system 580 within which a set of instructions, for causing the machine to perform any one or more of the methodologies discussed herein, can be executed. In some embodiments, the computer system 580 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the multi-plane operation component 112 and/or 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 580 includes a processing device 582, a main memory 586 (e.g., read-only memory (ROM), flash memory, dynamic random access memory (DRAM) such as synchronous DRAM (SDRAM) or Rambus DRAM (RDRAM), etc.), a static memory 594 (e.g., flash memory, static random access memory (SRAM), etc.), and a data storage system 590, which communicate with each other via a bus 592.

The processing device 582 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 582 can also be one or more special-purpose processing devices such as an application specific integrated circuit (ASIC), a field programmable gate array (FPGA), a digital signal processor (DSP), network processor, or the like. The processing device 582 is configured to execute instructions 584 for performing the operations and steps discussed herein. The computer system 580 can further include a network interface device 596 to communicate over the network 588.

The data storage system 590 can include a machine-readable storage medium 596 (also known as a computer-readable medium) on which is stored one or more sets of instructions 584 or software embodying any one or more of the methodologies or functions described herein. The instructions 584 can also reside, completely or at least partially, within the main memory 586 and/or within the processing device 582 during execution thereof by the computer system 580, the main memory 586 and the processing device 582 also constituting machine-readable storage media. The machine-readable storage medium 596, data storage system 590, and/or main memory 586 can correspond to the memory sub-system 110 of FIG. 1.

In one embodiment, the instructions 584 include instructions to implement functionality corresponding to a super-block construction component (e.g., the multi-plane operation component 112 and/or 113 of FIG. 1). While the machine-readable storage medium 596 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   receiving, from a processing device, a set feature command that enables a configuration associated with performance of a multi-plane read operation on a memory component, wherein the configuration defines a range of column addresses corresponding to a size of data transferred from each plane of the multi-plane read operation to a respective cache register of the memory component, wherein the range has a first marginal value and a second marginal value greater than the first marginal value;
   responsive to receiving an access request from the processing device to perform a multi-plane read operation on the memory component:
      transferring data out of a first buffer coupled to a first plane of a plurality of planes of a memory component, wherein the data was previously transferred from the first plane to the first buffer responsive to an access request to sense data stored in the plurality of planes of the memory component;
      updating a column address counter sequentially from the first marginal value to the second marginal value in response to a portion of the data corresponding to a column address of the first plane being transferred out of a cache register coupled to the first plane; and
      transferring, in response to the updated column address counter indicating the second marginal value and independently of the access request received from the processing device, data out of a second buffer coupled to a second plane of the plurality of planes of the memory component, wherein the data transferred out of the second buffer was previously transferred from the second plane to the second buffer responsive to the access request to sense the data.

2. The method of claim 1, further comprising:
   determining, in response to the updated column address counter indicating the second marginal value, that a portion of the data transferred out of the first buffer corresponds to a last column address of the first plane; and
   transferring data out of the second buffer corresponding to a first column address of the second plane responsive to the determination.

3. The method of claim 1, wherein transferring the data out of the second buffer independently of the access request from the processing device comprises transferring the data out of the second buffer without receiving a command from the processing device.

4. The method of claim 1, wherein transferring the data out of the second buffer independently of the access request received from the processing device comprises transferring the data out of the second buffer without a column address cycle or a row address cycle associated with executing a command from the processing device.

5. The method of claim 1, further comprising transferring the data out of the second buffer upon expiration of a change column setup time subsequent to transferring the data out of the first buffer.

6. A system, comprising:
a memory component having a plurality of planes; and
a processing device, operatively coupled with the memory component, to:
issue, to the memory component, a set feature command to enable and provide a configuration that defines a range of column addresses corresponding to a size of data transferred from each plane of the plurality of planes to a respective cache register of the memory component; and
provide, to the memory component, an access request to perform a multi-plane read operation and to cause the memory component to:
transfer data out of a first buffer, wherein the data was previously transferred to the first buffer from a page of a first plane of the plurality of planes in response to an access request to sense data stored in the plurality of planes;
update a column address counter sequentially from a first marginal value of the range of column addresses to a second marginal value of the range of column addresses in response to a portion of the data corresponding to a column address of the first plane being transferred out of a cache register coupled to the first plane; and
transfer, in response to the updated column address counter indicating the second marginal value, data out of a second buffer independently of the access request from the processing device, wherein the data transferred out of the second buffer was previously transferred to the second buffer from a page of a second plane of the plurality of planes to the second buffer in response to the access request to sense the data.

7. The system of claim 6, wherein the first and second buffers comprise cache registers respectively coupled to the first and the second planes.

8. The system of claim 6, wherein the processing device is to cause the memory component to transfer the data out of the second buffer without receiving a command from the processing device.

9. The system of claim 6, wherein the processing device is to cause the memory component to transfer the data out of the second buffer upon expiration of a change column setup time subsequent to the portion of the data corresponding to a last column address of the page being transferred out of the first buffer.

10. The system of claim 6, wherein the data is transferred out of the first buffer in a sequence from a portion of the data corresponding to a first column address of the page to the portion of the data corresponding to a last column address of the page.

11. The system of claim 6, wherein the processing device is to cause the memory component to transfer the data out of the first buffer or the second buffer without a column address cycle or a row address cycle associated with executing a command from the processing device.

12. A non-transitory computer-readable storage medium comprising instructions that, when executed by a processing device, cause the processing device to:
enable, by providing a set feature command to a memory component, a configuration associated with performance of a multi-plane read operation on the memory component to cause the memory component to read, to perform the multi-plane read operation, data from multiple planes of the memory component according to the enabled configuration, wherein the enabled configuration defines a range of column addresses corresponding to a size of data transferred from each plane of the multiple planes to a respective cache register of the memory component;
wherein the enabled configuration causes the memory component to, in response to receipt of an access request to perform the multi-plane read operation:
transfer data out of a first cache register coupled to a first plane of the multiple planes, wherein the data was previously transferred from the first plane to the first cache register in response to the access request;
update a column address counter sequentially from a first marginal value of the range of column addresses to a second marginal value of the range of column addresses in response to a portion of the data corresponding to a column address of the first plane being transferred out of the first cache register coupled to the first plane; and
transfer, in response to the updated column address counter indicating the second marginal value, data out of a second cache register coupled to a second plane of the multiple planes independently of a command to transfer data out of the second cache register.

13. The non-transitory computer-readable storage medium of claim 12, wherein the multi-plane read operation comprises an operation to read data stored in a respective page of each plane of the memory component.

14. The non-transitory computer-readable storage medium of claim 13, wherein the enabled configuration defines a range of column addresses corresponding to a size of the respective page of each plane of the memory component.

15. The non-transitory computer-readable storage medium of claim 12, wherein the memory component comprises a plurality of dice each comprising a plurality of planes, and the processing device is further to issue a respective set feature command to each one of the plurality of dice.

16. The non-transitory computer-readable storage medium of claim 12, wherein the enabled configuration causes the memory component to perform the multi-plane read operation without further receiving a change read column enhanced command from the processing device.

17. The non-transitory computer-readable storage medium of claim 12, wherein the enabled configuration causes the memory component to perform the multi-plane read operation without further receiving a change read column command from the processing device.

* * * * *